United States Patent
Akiyama et al.

(10) Patent No.: US 7,733,373 B2
(45) Date of Patent: Jun. 8, 2010

(54) SYSTEM AND METHOD OF NETWORK-LINKED DIGITAL TERRESTRIAL TELEVISION BROADCASTING

(75) Inventors: Yasuhiro Akiyama, Ome (JP); Koichi Hamada, Yokohama (JP); Masahiro Kageyama, Hino (JP); Osamu Hasegawa, Higashiyamato (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1113 days.

(21) Appl. No.: 11/358,446

(22) Filed: Feb. 21, 2006

(65) Prior Publication Data

US 2006/0212907 A1  Sep. 21, 2006

(30) Foreign Application Priority Data

Feb. 23, 2005  (JP) ............................. 2005-046638

(51) Int. Cl.
  *H04N 17/00* (2006.01)
  *H04N 5/38* (2006.01)
(52) U.S. Cl. ...................................... 348/192; 348/723
(58) Field of Classification Search ................. 348/180, 348/192, 607, 723, 735, 570, 838, 725, 466; 725/62; 455/556.1, 556.2, 67.11, 67.13, 455/226.1, 226.2; 370/225, 333; 375/346, 375/240.27; 714/746–748
See application file for complete search history.

(56) References Cited

U.S. PATENT DOCUMENTS

| | | | |
|---|---|---|---|
| 5,878,351 A * | 3/1999 | Alanara et al. | 455/466 |
| 6,097,965 A | 8/2000 | Honkasalo et al. | |
| 6,859,652 B2 * | 2/2005 | Karabinis et al. | 455/427 |
| 2003/0194980 A1 * | 10/2003 | Peterson et al. | 455/226.1 |
| 2003/0228857 A1 * | 12/2003 | Maeki | 455/278.1 |

(Continued)

FOREIGN PATENT DOCUMENTS

CN  1326626  12/2001

(Continued)

OTHER PUBLICATIONS

Hamacher C., "Spectral Coexistence of DVB-T and UMTS in a Hybrid Radio System", $1^{ST}$ Mobile Communication Summit, XX, XX, Sep. 1, 2001 (entire document).

(Continued)

*Primary Examiner*—Victor Kostak
(74) *Attorney, Agent, or Firm*—Cohen Pontani Liebermen & Pavane LLP (57) ABSTRACT

In a cellular phone terminal, a bit error rate measurement section measures a bit error rate of broadcast data received by a broadcast reception section for receiving a digital broadcast to output broadcast data while a transmission operation of a communication transmission section for wirelessly communicating with a broadcasting communication network is performed. When the measured bit error rate is equal to or higher than a predetermined threshold, stopping of the transmission operation of the communication transmission section is instructed. Thus, a failure such as interruption of television broadcasting reproduction can preliminarily be prevented by avoiding error occurrence in reception of the 1 segment broadcasting service due to an influence of a transmission electric wave in data communication. As a result, stable reception of the 1 segment broadcasting service can be executed.

10 Claims, 10 Drawing Sheets

U.S. PATENT DOCUMENTS

| | | |
|---|---|---|
| 2003/0228892 A1 | 12/2003 | Maalismaa et al. |
| 2003/0236065 A1 | 12/2003 | Leinonen et al. |
| 2004/0032853 A1 | 2/2004 | D'Amico et al. |

FOREIGN PATENT DOCUMENTS

| | | |
|---|---|---|
| JP | 2002-094620 | 3/2002 |
| JP | 2003-009222 | 1/2003 |
| JP | 2003-110963 | 4/2003 |
| JP | 2003-134562 | 5/2003 |
| JP | 2003-289259 | 10/2003 |
| JP | 2004-048447 | 2/2004 |
| JP | 2004-146910 | 5/2004 |
| JP | 2004-147119 | 5/2004 |
| JP | 2004-158968 | 6/2004 |
| JP | 2004-207880 | 7/2004 |
| JP | 2004-215219 | 7/2004 |

OTHER PUBLICATIONS

Kornfeld M., "DVB-H—The emerging standard for mobile data communication", Consumer Electronics, 2004 IEEE International Symposium on Reading, UK Sep. 1-3, 2004, pp. 193-198.

* cited by examiner

SYSTEM AND METHOD OF NETWORK-LINKED DIGITAL TERRESTRIAL TELEVISION BROADCASTING

CROSS-REFERENCE TO RELATED APPLICATION

This application is based upon and claims the benefit of priority from the prior Japanese Patent Application No. 2005-046638, filed Feb. 23, 2005, the entire contents of which is incorporated herein by reference.

BACKGROUND OF THE INVENTION

1. Field of the Invention

The present invention relates to a technical field of a network-linked digital terrestrial television broadcasting system provided with both a digital television broadcast reception function and a bi-directional digital data communication function using a public telecommunication network where both the functions can operate in association with each other. In particular, the invention relates to a system and method of network-linked digital terrestrial television broadcasting in which an operation for data communication via a public telephone network is controlled on the basis of monitoring the result of a digital television broadcasting reception status.

2. Description of the Related Art

Since December 2003, Hivision program-based terrestrial digital broadcasting for household television sets has been operating in three major metropolitan districts of Japan: Tokyo, Nagoya, and Osaka. Its viewable area will gradually expand in years to come. Then in 2011, all the existing analog television broadcasting will stop, and the transition to the terrestrial digital broadcasting is expected to be completed.

Furthermore, preparation is under way for implementation of terrestrial digital broadcasting for mobile terminals such as cellular phones and personal digital assistances (PDA) (hereinafter, referred to as 1 segment broadcasting service) The 1 segment broadcasting service uses a low communication bit rate of 2 Mbps or lower and therefore can only transmit low-resolution video as compared with the terrestrial digital broadcasting for household television sets. However, the realization of a new service, which has been difficult, is now anticipated such as stable reception of the broadcast by devices in motion or the integration of the broadcast reception with data communication by making use of a mobile terminal's characteristics. Above all, a linked service system of the broadcast reception and the data communication can easily be structured by adding a reception function for the 1 segment broadcasting service to a cellular phone so the cellular phone industry is paying particular attention to the new service.

When the network-linked digital terrestrial television broadcasting function operates on the cellular phone, depending on a certain particular condition, a failure such as interruption of television broadcast reproduction may be caused because of an occurrence of a reception error in the 1 segment broadcasting service due to the influence of a transmission electric wave on a data communication side. To ensure an acceptable video reduction quality in the 1 segment broadcasting service, avoiding this problem is a very critical issue.

As a conventional art for solving this problem, for example, Japanese Laid-Open Patent Application No. 2003-009222 discloses a method of stopping a transmission operation based on the determination that a reception side will suffer a negative effect when a sum of an electric power of a transmission electric wave and an electric power of a reception electric wave exceeds a predetermined threshold.

Japanese Laid-Open Patent Application No. 2004-146910 also discloses a method of predicting a degradation condition of the reception sensitivity through a calculation from a relation between a transmission electric wave frequency and a reception electric wave frequency and changing the transmission frequency when it is judged that degradation of the sensitivity on the reception side will occur on the basis of the prediction.

However, according to the method disclosed in Japanese Laid-Open Patent Application No. 2003-009222, no mechanism is provided for confirming whether or not the reception side actually suffers a negative effect even when the sum of the electric power of the transmission electric wave and that of the reception electric wave exceeds the predetermined threshold so there is a problem in that accuracy of avoiding the reception failure cannot be secured. In addition, according to the method disclosed in Japanese Laid-Open Patent Application No. 2004-146910, although the degradation condition for sensitivity on the reception side is predicted through the calculation from the relation between the operating transmission electric wave frequency and the operating reception electric wave frequency, no mechanism is provided for confirming whether or not the reception side actually suffers a negative effect in this case too. Thus, there is also a problem in that the accuracy of avoiding the reception failure cannot be secured. Moreover, when both the functions of the reception of the 1 segment broadcasting service and the data communication are realized in a compact mobile terminal such as a cellular phone, an antenna for receiving the 1 segment broadcasting service and another antenna for performing the data communication need to be mounted physically close to each other. Thus, the influence of the transmission electric wave on the data communication side more severely disturbs the reception of the 1 segment broadcasting service.

SUMMARY OF THE INVENTION

The present invention has been made in view of the above-mentioned circumstances, and it is therefore an object of the present invention to provide a system of network-linked digital terrestrial television broadcasting and a method of network-linked digital terrestrial television broadcasting with which stable reception of a 1 segment broadcasting service can be executed.

To achieve the above object, a system of network-linked digital terrestrial television broadcasting according to one aspect of the present invention includes: broadcast reception means for receiving a digital broadcast to output broadcast data; communication means for performing wireless communication with a broadcasting communication network; error detection means for detecting a bit error rate of the broadcast data received by the broadcast reception means; and instruction means for instructing a transmission operation of the communication means to stop when the bit error rate of the broadcast data detected by the error detection means is equal to or higher than a predetermined threshold while the transmission operation of the communication means is executed.

Further, to achieve the above object, a method of network-linked digital terrestrial television broadcasting according to another aspect of the present invention includes the steps of: receiving a digital broadcast to output broadcast data; communicating wirelessly with a broadcasting communication network; detecting a bit error rate of the broadcast data received in the receiving step; and instructing a transmission operation of the communicating step to stop when the bit error rate of the broadcast data detected in the detecting step is equal to or higher than a predetermined threshold while the transmission operation of the communicating step is performed.

According to the present invention, a failure such as interruption of television broadcast reproduction can preliminarily be prevented by avoiding the error occurrence in reception of the 1 segment broadcasting service due to the influence of the transmission electric wave in the data communication. As a result, the stable reception of the 1 segment broadcasting service can be executed.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 10 shows an example of a cellular phone 1000 compliant with terrestrial digital broadcasting for mobile terminals (1 segment broadcasting service) to which the terminal 100 according to the embodiment is applied.

DETAILED DESCRIPTION OF THE PREFERRED EMBODIMENTS

The present invention will hereinafter be described with reference to the preferred embodiments shown in the accompanying drawings.

Figure 1:
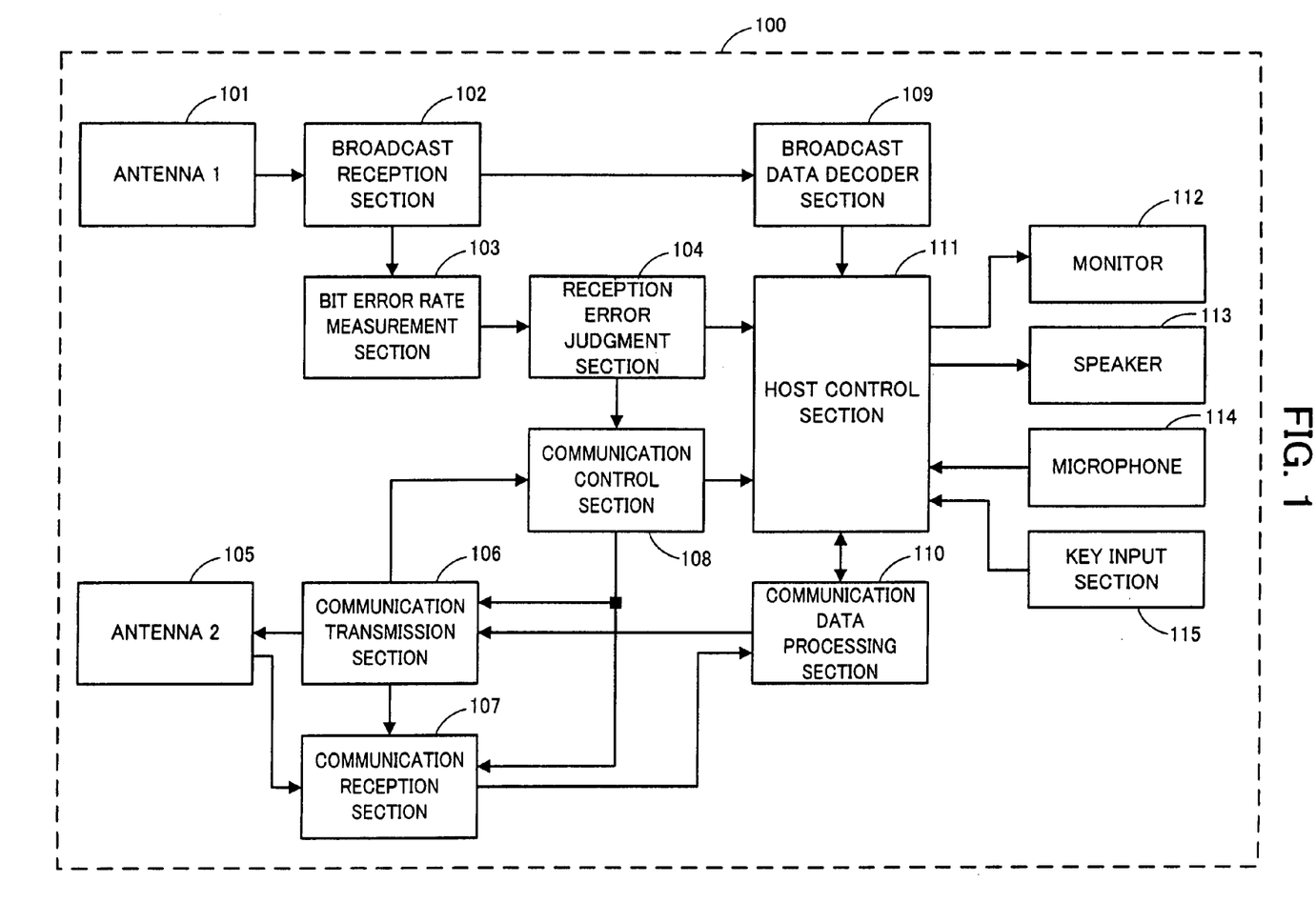
FIG. 1 is a block diagram showing a structure of a terminal 100 according to an embodiment of the present invention.

FIG. 1 is a block diagram showing a structure of a terminal 100 according to an embodiment of the present invention. The terminal 100 shown in FIG. 1 is an example of a cellular phone terminal provided with a 1 segment broadcasting service reception function and a bi-directional digital data communication function using a public wireless network where both the functions can operate in association with each other. A frequency band of a 1 segment broadcasting uses an ultra-high frequency (UHF: 470 MHz to 770 MHz) band, and the bi directional digital data communication uses a frequency band of CDMA2000 1×EV-DO (CDMA2000 1×Evolution Data Only, hereinafter abbreviated as EV-DO) (800 MHz band).

A broadcast reception section 102 including an antenna 1 (denoted by reference numeral 101), a tuner, and a radio frequency (RF) decoder receives a 1 segment broadcasting service broadcast wave. The broadcast reception section 102 transmits broadcast data decoded through a predetermined method to a broadcast data decoder section 109 and also transmits a bit error rate of the data internally measured on the basis of the broadcast data to a bit error rate measurement section 103. The broadcast data decoder section 109 performs a structural analysis of the broadcast data, extracts necessary data from the broadcast data, and transmits the necessary data to a host control section 111.

Data communication performed with connection to a public telecommunication network for cellular phones includes transmission and reception of communication data via a data antenna 2 (105). At the time of the transmission, the transmission data generated by the host control section 111 is transmitted to a communication data processing section 110. The communication data processing section 110 converts the transmission data into a predetermined transmission format and transmits the converted data to a communication transmission section 106. The communication transmission section 106 performs modulation on the communication data through a predetermined method and transmits the modulated data from the antenna 2 (105). At the time of the reception, a communication reception section 107 receives data via the antenna 2 (105). The communication reception section 107 performs demodulation through a predetermined method to retrieve reception data and transmits the reception data to the communication data processing section 110. The communication data processing section 110 performs a structural analysis on the reception data, and also extracts necessary data from the reception data to transmit the necessary data to the host control section 111.

A bit error rate measurement section 103 measures a bit error rate of the broadcast data transmitted from the broadcast reception section 102 and transmits the result to a reception error judgment section 104. The reception error judgment section 104 judges whether or not a reception error has occurred in the broadcast data from the input bit error rate and transmits the result to a communication control section 108 and the host control section 111. In the judgment, the input bit error rate and a predetermined threshold are compared with each other and when the bit error rate is equal to higher than the threshold, it is determined that the reception error has occurred. The communication control section 108 checks whether the communication transmission section 106 performs transmission operation. When the reception error occurs while the transmission operation is performed, such a control is conducted that the transmission operation of the communication transmission section 106 and the reception operation of the communication reception section 107 are stopped. Then, the communication control section 108 notifies the host control section 111 of that control status.

The host control section 111 outputs content data such as video, audio, and texts of the received 1 segment broadcasting service to a monitor 112 and a speaker 113 for reproduction or display. Content data such as video, audio, and texts received from the public wireless network are similarly reproduced or displayed. The host control section 111 also conducts network-linked digital terrestrial television broadcasting for performing the content display while associating the 1 segment broadcasting service with the data communication.

The network-linked digital terrestrial television broadcasting refers to an operation where, when a user watches a drama program in the form of the 1 segment broadcasting service, tag data previously added to the broadcast data is analyzed and information on the drama is automatically downloaded via the public wireless network to be displayed on the monitor simultaneously, for example. The tag data describes an address indicating a location of a content server where the information on the drama is stored, or the like. As another example, the following operation can be executed. When the user watches a television shopping program in the form of the 1 segment broadcasting service and desires to buy a product introduced in the program, an input screen for the purchase is displayed on the monitor along with the television program, and data communication is performed according to a purchasing operation by the user to execute the product purchase procedure. The data of the input screen for the purchase procedure is displayed with reference to the tag data previously added to the broadcast data.

Moreover, when a reception error occurs in the reception data of the 1 segment broadcasting service during the network-linked digital terrestrial television broadcast and the communication control section 108 accordingly stops the operations of the communication transmission section 106 and the communication reception section 107, the host control section 111 notifies the user of the current status by way of monitor display.

Figure 2:
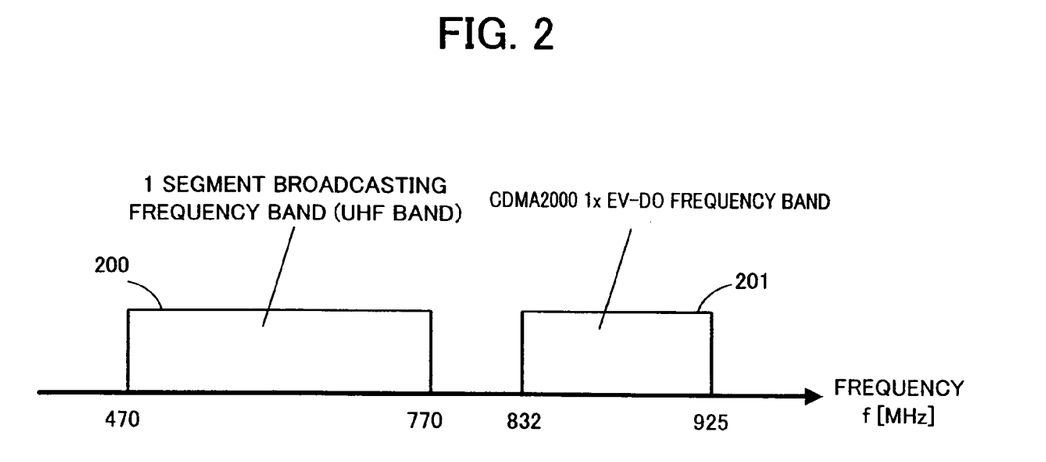
FIG. 2 shows a relation between frequency bands used by the terminal 100.

FIG. 2 shows a relation between frequency bands used by the terminal 100 of the present invention.

The 1 segment broadcasting service uses one of 50 channels (13 to 62 ch) obtained by dividing a UHF band 200 (470 MHz to 770 MHz) every 6 MHz for broadcasting. The bi-directional digital data communication of the cellular phone via the public wireless network uses a predetermined frequency of an EV-DO frequency band 201 (800 MHz to 925 MHz) to perform communication. The two frequency bands are adjacent to each other. Therefore, when the broadcast reception and the transmission operation for the data communication are simultaneously executed, an error may occur in the reception data of the 1 segment broadcasting service due to an influence of an EV-DO transmission electric wave transmitted from an EV-DO transmission terminal under certain conditions. The conditions for causing the reception error occurrence herein include, for example, a case where the reception electric wave strength of the 1 segment broadcasting service is extremely weak and the reception electric wave strength of the wireless base station is weak as well. When the reception electric wave strength of the wireless base station is weak during the data communication execution, such a control is conducted that the transmission electric wave transmitted from the EV-DO transmission terminal is automatically strengthened to ensure a qualifying line quality. Thus, as the reception electric wave strength of the 1 segment broadcasting service is weaker, the data communication is more easily disturbed by the influence.

In the 1 segment broadcasting service, when an error occurs in receiving the broadcast data, correction of the error part is essentially difficult due to the nature of the time-dependent 1 segment broadcasting service. On the other hand, in the bi-directional digital data communication, data retransmission can be performed. So even when the communication operation is temporarily stopped, data reacquisition can be executed afterwards. According to the terminal of the present invention, when a reception error occurs in the broadcast data during the network-linked digital terrestrial television broadcasting operation, such a control is conducted that the transmission operation for the data communication is temporarily stopped for placing priority on normal reception of the 1 segment broadcasting service to prevent the reception error occurrence in the broadcast data.

Figure 3A:
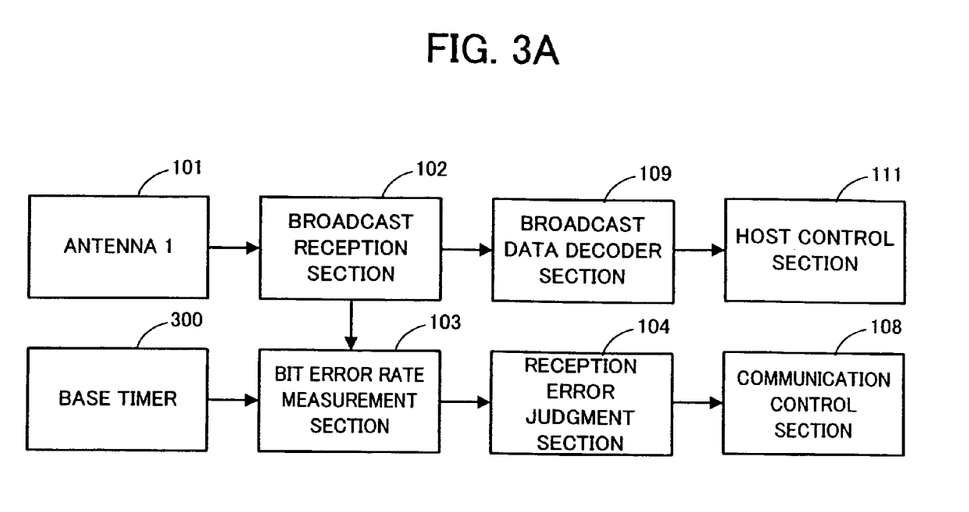
FIGS. 3A and 3B show a bit error rate measurement operation during reception of a 1 segment broadcasting service.
Figure 3B:
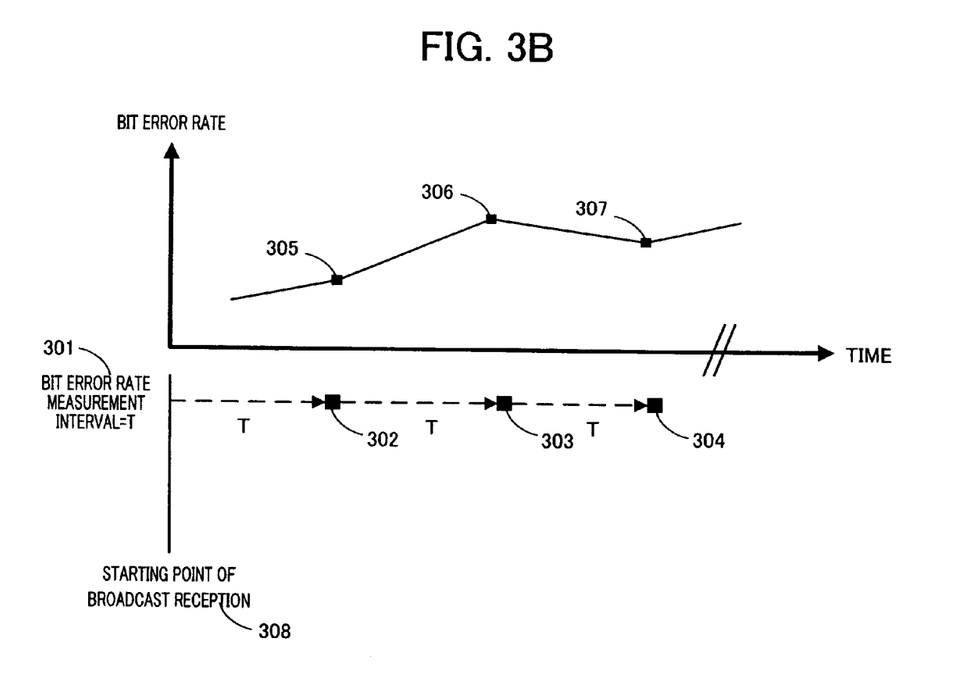

FIGS. 3A and 3B show a bit error rate measurement operation during the reception of the 1 segment broadcasting service.

As shown in FIG. 3A, the antenna 1 (101) receives the 1 segment broadcasting service, the broadcast reception section 102 selects a station and demodulates data to output the broadcast data. From the broadcast data, data necessary for the broadcast data decoder section 109 is extracted and transmitted to the host control section 111. The broadcast data output by the broadcast reception section 102 is also transmitted to the bit error rate measurement section 103 to enable measurement of a bit error rate of the received broadcast data. The measurement is performed at a predetermined timing with reference to a base timer 300 built in the terminal 100. For example, as shown in FIG. 3B, when a bit error rate measurement interval 301 is previously set as T, measurement (302, 303, 304) of the bit error rate of the broadcast data is executed at regular time intervals of T from a starting point 308 of the 1 segment broadcasting service reception. The measurement interval may be set so as to be fixed from beginning to end or may be arbitrarily varied. The measured data is stored in the bit error rate measurement section 103 and also transmitted to the reception error judgment section 104. Further, the judgment result of the reception error occurrence is transmitted to the communication control section 108.

Figure 4:
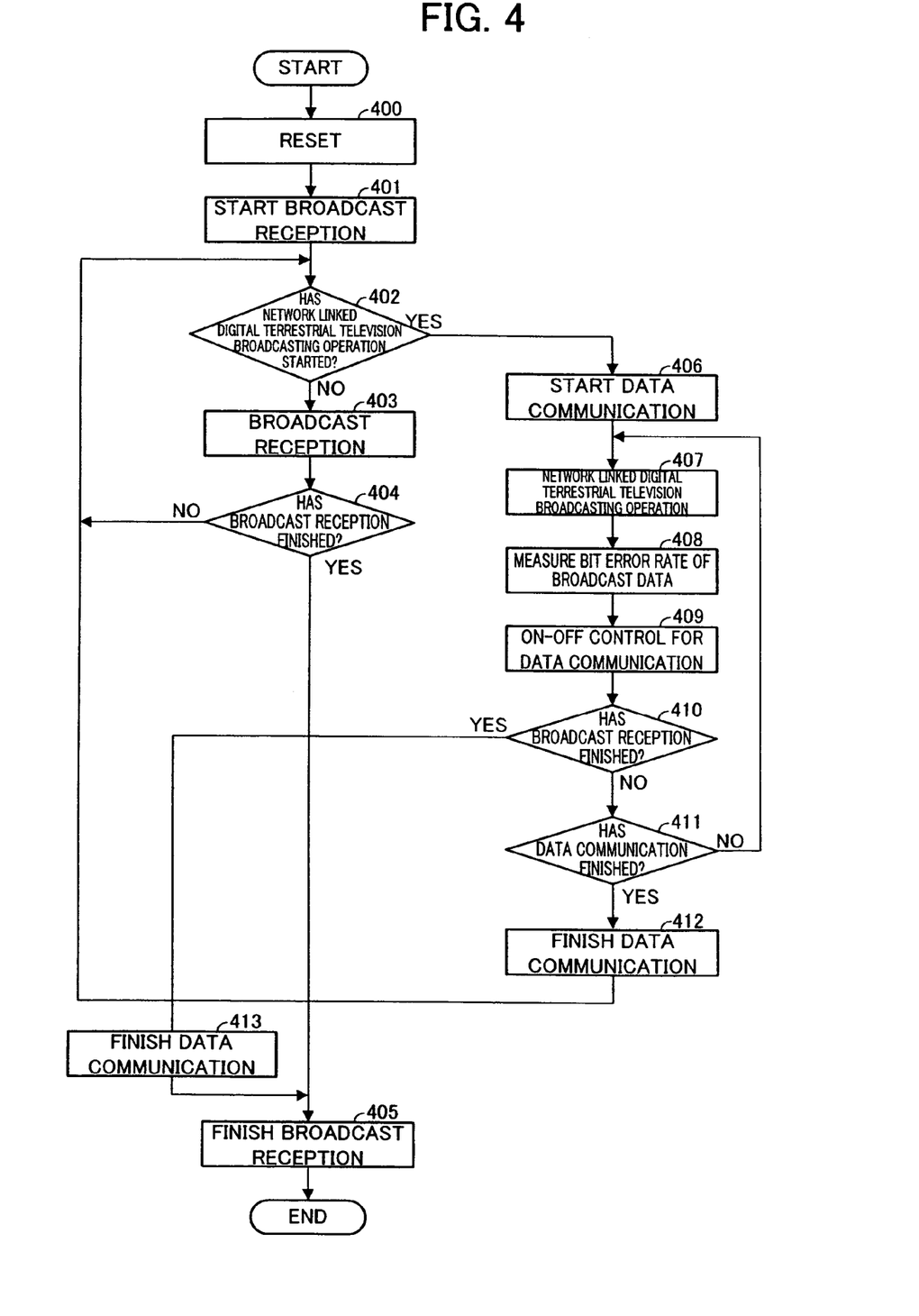
FIG. 4 is a flowchart of a switching operation between a 1 segment broadcasting service reception operation and a network-linked digital terrestrial television broadcasting operation.

FIG. 4 is a flowchart of a typical switching operation between the 1 segment broadcasting service reception operation and a network-linked digital terrestrial television broadcasting operation. In an example shown in FIG. 4, a description is given of a flow of transition from an independent operation of the 1 segment broadcasting service reception that starts first to the network-linked digital terrestrial television broadcasting operation for simultaneously executing the 1 segment broadcasting service reception and the data communication following the independent operation of the 1 segment broadcasting service reception.

First of all, resetting of the terminal is performed (Step 400) and the 1 segment broadcasting service reception starts (Step 401). Next, judgment is made as to whether or not the network-linked digital terrestrial television broadcasting operation for simultaneously executing the 1 segment broadcasting service reception and the data communication starts (Step 402). This judgment depends on the presence or absence of a request for simultaneously executing the 1 segment broadcasting service reception and the data communication, or the like (for example, due to a user's operation). If the 1 segment broadcasting service reception and the data communication are simultaneously executed, the case is judged to be the network-linked digital terrestrial television broadcasting operation.

When the network-linked digital terrestrial television broadcasting operation is not performed, the independent operation of the 1 segment broadcasting service reception is continuously performed (Step 403). Then, judgment is made as to whether or not the independent operation of the 1 segment broadcasting service reception has finished (for example, due to a user's operation) (Step 404). When the independent operation has not finished, the process returns to Step 402. When the independent operation has finished, the reception operation of the 1 segment broadcasting service finishes (Step 405).

In Step 402, when the network-linked digital terrestrial television broadcasting operation starts, the data communication via the public wireless network immediately starts (Step 406) and the 1 segment broadcasting service reception and the data communication are simultaneously executed (Step 407). During the network-linked digital terrestrial television broadcasting operation, the measurement for the bit error rate of the broadcast data is executed (Step 408) and the ON-OFF control for the data communication is executed according to the result (Step 409). Next, judgment is made as to whether or not the 1 segment broadcasting service reception has finished (for example, due to a user's operation) (Step 410). When the 1 segment broadcasting service reception has finished, the data communication finishes (Step 413) and the 1 segment broadcasting service reception finishes (Step 405). When the 1 segment broadcasting service reception has not finished, further judgment is subsequently made as to whether or not the data communication has finished (for example, due to a user's operation) (Step 411). When the data communication has not finished, the network-linked digital terrestrial television broadcasting operation continues and the process returns to Step 407. When the data communication has finished, the operation for the data communication finishes (Step 412) and the process returns to Step 402.

It should be noted that when the process advances to Step 406 where the data communication starts and if the broadcast reception finishes before the data communication is completed (i.e., before the result "Yes" is judged in Step 411), only the network-linked digital terrestrial television broadcasting operation finishes and the data communication still continues.

Figure 5A:
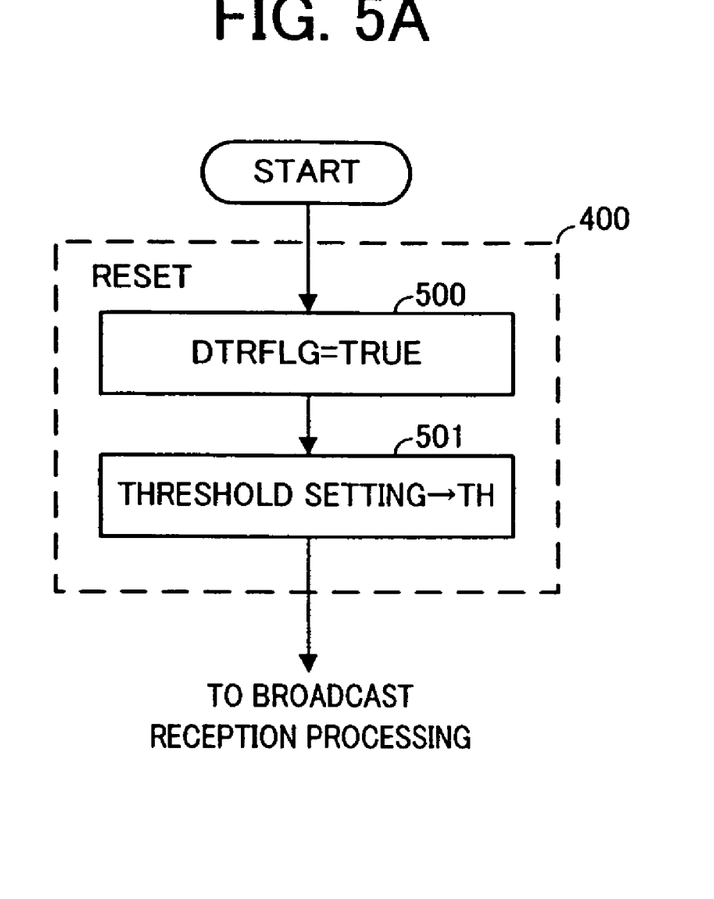
FIG. 5A shows a default setting flow for a reception error judgment section and a communication control section.
Figure 5B:
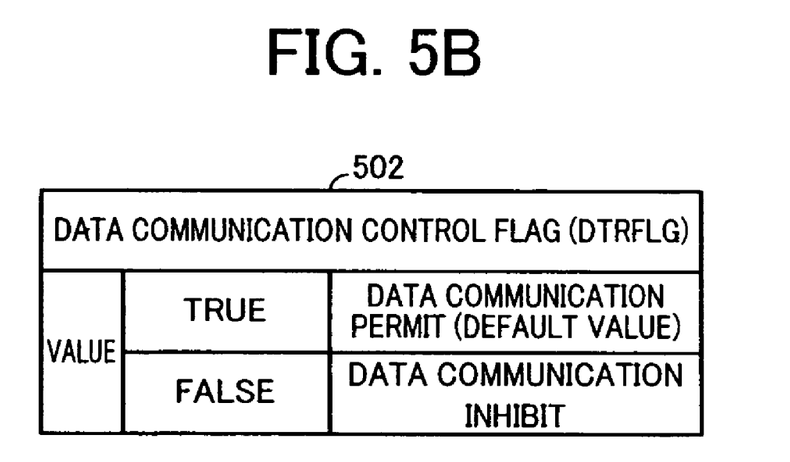
FIG. 5B shows a flag.

FIG. 5A shows a default setting flow for operations of the reception error judgment section 104 and the communication control section 108. When the communication control section 108 performs the ON-OFF control for the data communication, a data communication control flag 502 (DTRFLG) shown in FIG. 5B is used. The data communication control flag 502 (DTRFLG) is a value indicating one of a status where the communication control section 108 permits the data communication (TRUE) and a status where the communication control section 108 inhibits the data communication (FALSE). The value is stored in the communication control section 108. At the reception start of the 1 segment broadcasting service, permitting of the data communication (TRUE) is set as a default value (Step 500). Furthermore, the reception error judgment section 104 sets a threshold (TH) for comparison with the bit error rate measurement data (Step 501).

Figure 6:
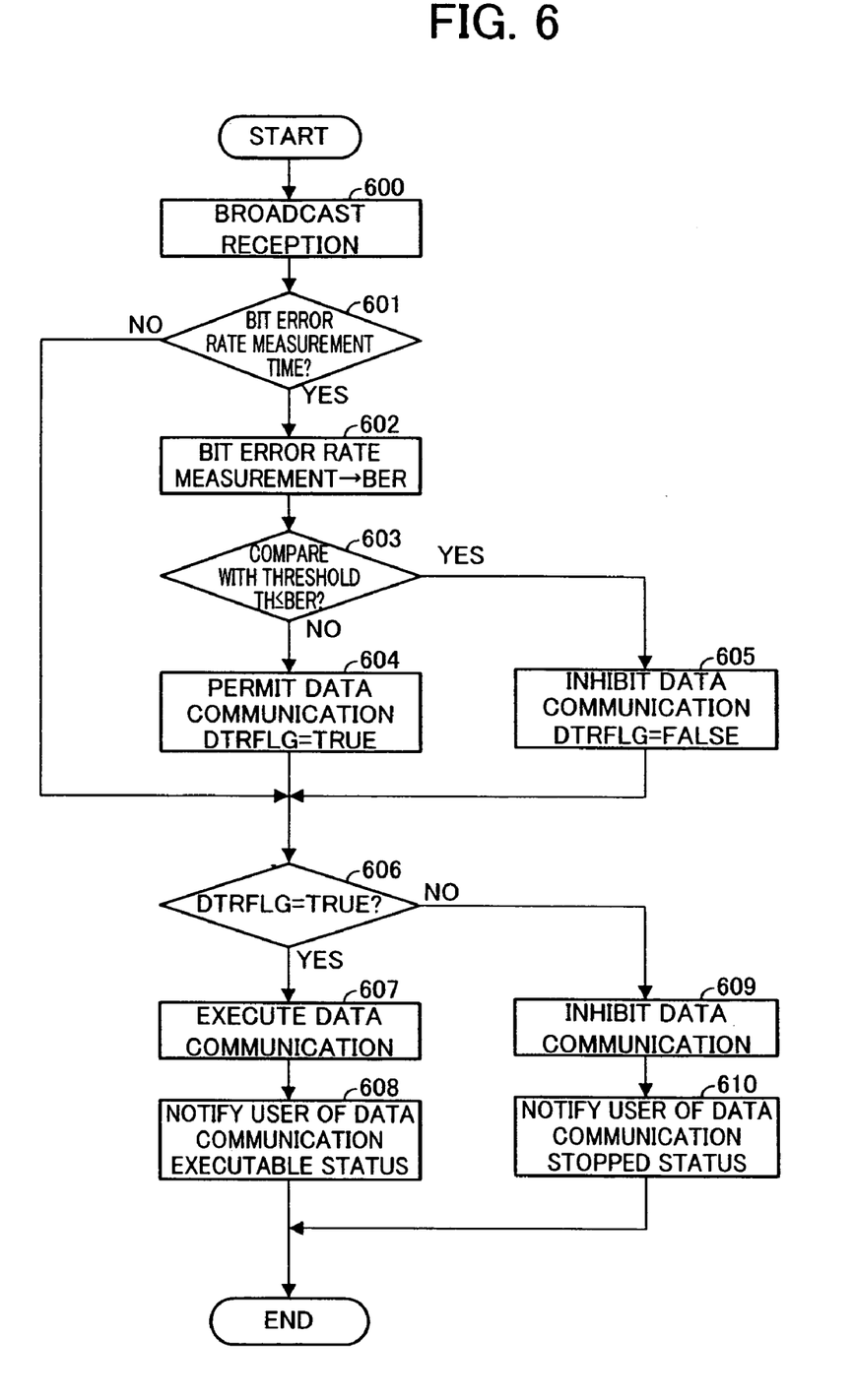
FIG. 6 is a flowchart of an ON-OFF control operation for the data communication during the network-linked digital terrestrial television broadcasting operation.

FIG. 6 is a flowchart of an operation of the ON-OFF control for the data communication during the network-linked digital terrestrial television broadcasting operation. Herein, the terminal 100 has already started the network-linked digital terrestrial television broadcasting operation. When the terminal 100 is in a 1 segment broadcasting service reception status (Step 600), the bit error rate measurement section 103 refers to time information of the base timer 300 to check whether or not the time has reached a measurement time T for the bit error rate of the broadcast data (Step 601). When the time has not reached the measurement time T, the bit error rate measurement is skipped and the operation according to the status of the data communication control flag 502 (DTRFLG) continues.

On the other hand, when the time has reached the measurement time T, a bit error rate BER of the broadcast data is measured (Step 602). Next, the measured bit error rate BER and the threshold TH previously stored in the terminal 100 are compared with each other (Step 603). When the bit error rate BER is lower than the threshold TH, it is judged that the entire received broadcast data can normally be decoded so the value (TRUE) indicating permitting of the data communication is set in the data communication control flag 502 (DTRFLG) (Step 604).

Meanwhile, when the bit error rate BER is equal to or higher than the threshold TH, it is judged that a part or all of the broadcast data cannot normally be decoded and the value (FALSE) indicating inhibiting of the data communication is set in the data communication control flag 502 (DTRFLG) (Step 605).

After that, the value set in the data communication control flag 502 (DTRFLG) is checked (Step 606) and control according to the value of the operational status of the data communication is conducted. When the data communication control flag 502 (DTRFLG) is data communication permitted (TRUE), the data communication is executed (Step 607) and the user is notified of the data communication executable status by way of display to that effect on the monitor 112, for example (Step 608). When the data communication control flag 502 (DTRFLG) is data communication inhibited (FALSE), the data communication stops (Step 609) and the user is notified of the data communication stopped status (Step 610).

Figure 7:
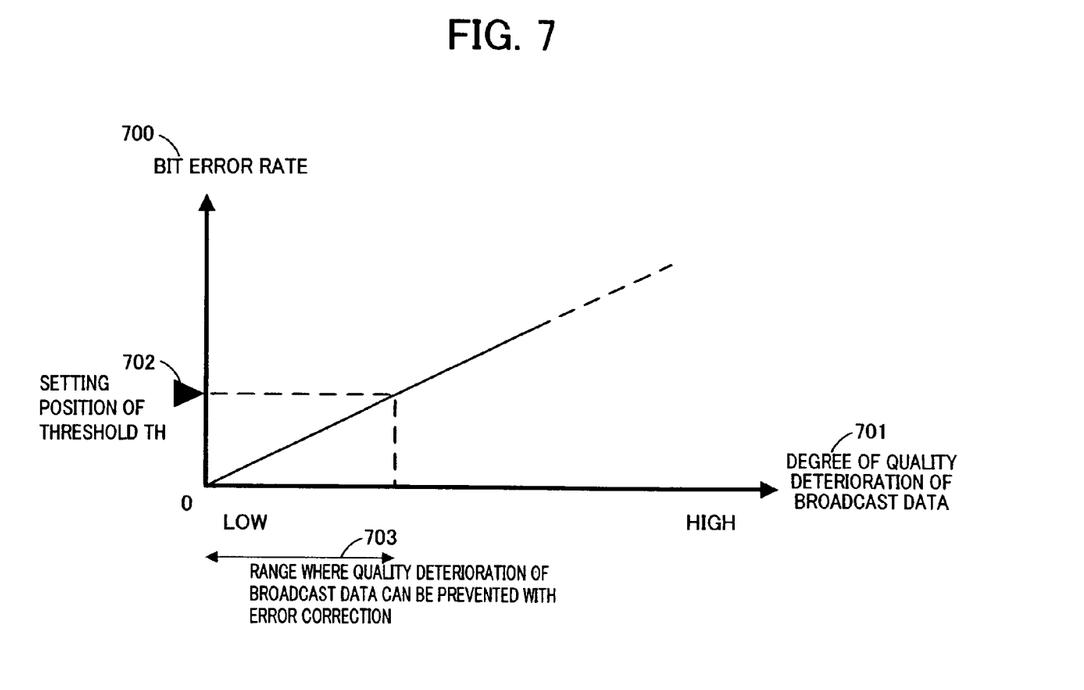
FIG. 7 shows a relation between a bit error rate and the degree of quality deterioration of broadcast data that has been received.

FIG. 7 is a graph showing a relation between the bit error rate and the degree of quality deterioration of the received broadcast data. In FIG. 7, the vertical axis represents a bit error rate 700 and the horizontal axis represents the degree of quality deterioration of the received broadcast data 701. As is apparent from the relation shown in FIG. 7, the degree of quality deterioration of the broadcast data is proportional to the bit error rate. The higher the bit error rate, the higher the degree of quality deterioration of the broadcast data. Therefore, the decoding becomes more difficult.

On the other hand, when the bit error rate is not higher than a predetermined value, it is known that the degree of quality deterioration of the broadcast data can be improved in a certain range 703 by executing error correction processing. The predetermined value is $(2\times10)^{-4}$. Therefore, a threshold 702 (TH) for comparison with the bit error rate BER of the operational flow shown in FIGS. 5A, 5B, and 6 is normally set as $(2\times10)^{-4}$. However, the threshold 702 (TH) may be set lower than $(2\times10)^{-4}$ or an arbitrary value to allow for a margin with respect to the degree of quality deterioration of the received broadcast data 701 in advance.

Figure 8:
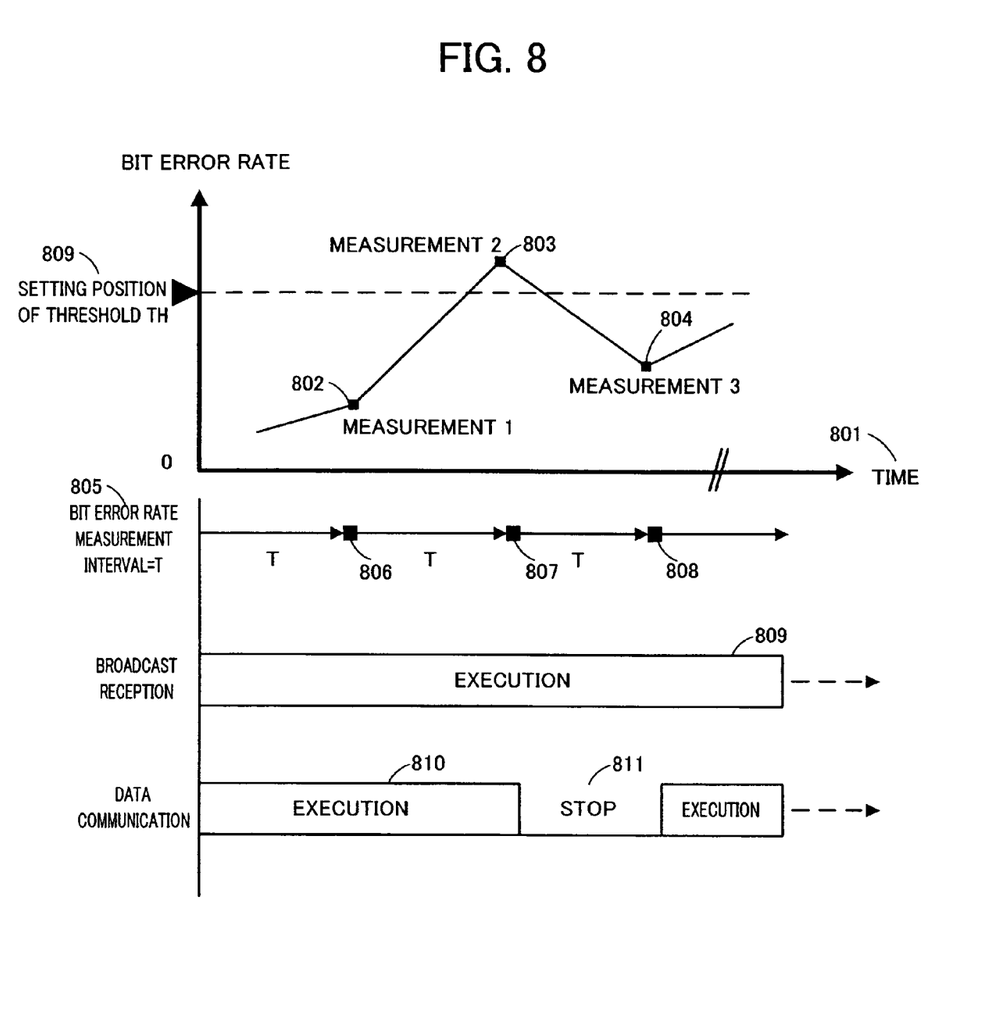
FIG. 8 shows an example of an operational relation between the error bit rate of the broadcast data during the network-linked digital terrestrial television broadcasting operation and the ON-OFF control for the data communication.

FIG. 8 shows an example of the operational relation between the error bit rate of the broadcast data during the network-linked digital terrestrial television broadcasting operation and the ON-OFF control for the data communication. Herein, the bit error rate measurement interval for the broadcast data is set as T, the bit error rate threshold TH is set as $(2\times10)^{-4}$, and the terminal 100 is already executing the network-linked digital terrestrial television broadcasting operation.

When the bit error rate is measured at the measurement interval T (i.e., at time points 806, 807, and 808), the measurement results at the respective time points are referred to as a measurement 1 (802), a measurement 2 (803), and a measurement 3 (804). During the network-linked digital terrestrial television broadcasting operation, reception of the 1 segment broadcasting service is continuously executed (809). On the other hand, in the data communication, according to the measurement results of the bit error rate, the ON-OFF control for the data communication is performed at the timing of the measurement time points.

According to the example of FIG. 8, at the measurement 1 (802), the bit error rate is not higher than the threshold TH and the data communication is therefore continuously executed (810). Next, at the measurement 2 (803), the bit error rate exceeds the threshold TH and the data communication therefore stops (811) to prevent the degradation in the reception data of the 1 segment broadcasting service. At the measurement 3 (804), the bit error rate is not higher than the threshold TH again and the data communication is therefore resumed (811).

In this way, when an error occurs in the 1 segment broadcasting service reception due to the influence of the transmission electric wave on the data communication side, the operation for the data communication stops to prevent the error occurrence in the broadcast data. It should be noted that the reception operation for the data communication does not influence the 1 segment broadcasting service reception data, so the reception operation may not be subjected to the ON-OFF control, or for simplifying the control procedure, the reception operation may also be subjected to the ON-OFF control along with the transmission operation.

Figure 9:
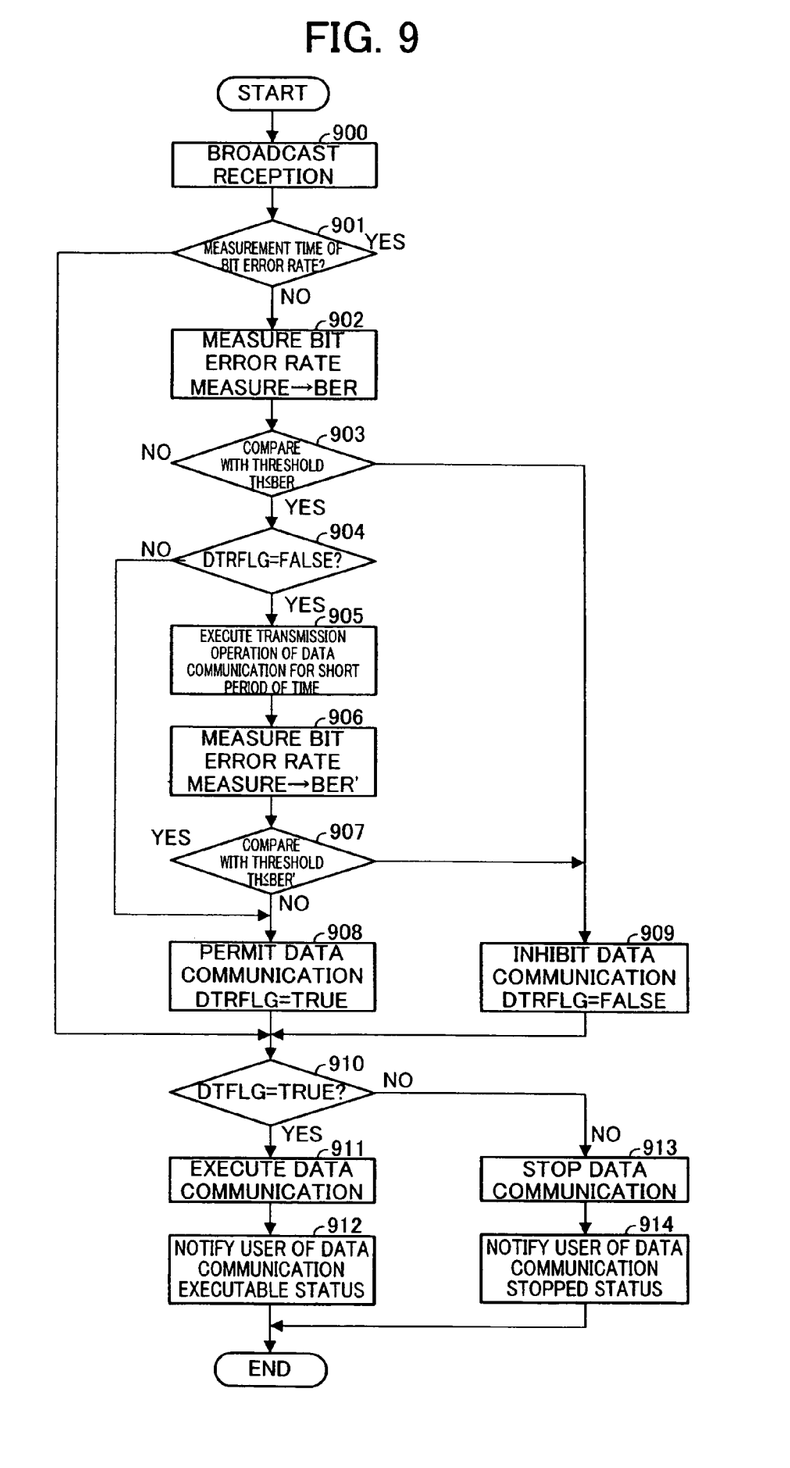
FIG. 9 is a flowchart of the ON-OFF control operation for the data communication during the network-linked digital terrestrial television broadcasting operation.

FIG. 9 is a flowchart of the ON-OFF control operation for the data communication during the network-linked digital terrestrial television broadcasting operation.

In the ON-OFF control for the data communication according to the operational flow shown in FIG. 6, as the condition for returning to the data communication permitted status from the data communication inhibited status, such a procedure is taken that the bit error rate measurement value BER and the threshold TH are compared with each other and when the bit error rate BER is equal to or lower than the threshold TH, returning to the data communication permitted status is performed. Meanwhile, according to an example of the operational flow shown in FIG. 9, an additional step is inserted in the procedure for returning to the data communication permitted status to enhance the accuracy of the ON-OFF control for the data communication.

Hereinafter, a description is given of the operation with reference to FIG. 9. It should be noted herein that the terminal 100 is already executing the network-linked digital terrestrial television broadcasting operation. When the terminal 100 is in the 1 segment broadcasting service reception status (Step 900), the bit error rate measurement section 103 refers to time information of the base timer 300 to check whether or not the bit error rate of the broadcast data has reached the measurement time T (Step 901). When the time has not reached the measurement time T, the bit error rate measurement is skipped and the operation according to the data communication control flag 502 (DTRFLG) continues.

On the other hand, when the time has reached the measurement time T, the bit error rate BER of the broadcast data is measured (Step 902). Subsequently, the measured bit error rate BER and the threshold TH previously set in the terminal 100 are compared with each other (Step 903). When the bit error rate BER is equal to or higher than the threshold TH, it is determined that a part or all of the broadcast data cannot normally be decoded and the data communication control flag 502 (DTRFLG) is set as the value (FALSE) indicating inhibiting of the data communication (Step 909).

When the bit error rate BER is lower than the threshold TH, the current value of the data communication control flag 502 (DTRFLG) is subsequently checked (Step 904). When the value indicates that the data communication is permitted (TRUE), the value is stored. When the value indicates inhibiting of the data communication (FALSE) before the data communication is permitted, the transmission operation for the data communication is tentatively executed for a short period of time (Step 905) to measure a bit error rate BER' at this time (Step 906). Thereafter, the bit error rate BER' and the threshold TH are compared with each other (Step 907). When the bit error rate BER' is lower than the threshold TH, it is determined that the reception status of the 1 segment broadcasting service has been improved to such a level that the reception is not disturbed by the influence of the transmission operation for the data communication. Then, the data communication control flag 502 (DTRFLG) is set as the value indicating that the data communication is permitted (TRUE) (Step 908).

When the bit error rate BER' is equal to or higher than the threshold TH, it is determined that the 1 segment broadcasting service reception status is still disturbed by the influence of the transmission operation for the data communication. The value indicating inhibiting of the data communication (FALSE) is therefore stored (Step 909). After that, the set value of the data communication control flag 502 (DTRFLG) is checked (Step 910) and the operational status of the data communication is controlled according to the value. When the data communication control flag 502 (DTRFLG) indicates that the data communication is permitted (TRUE), the data communication is executed (Step 911) and the user is notified of the data communication executable status by way of display to that effect on the monitor 112, for example (Step 912). When the data communication control flag 502 (DTRFLG) indicates that the data communication is inhibited (FALSE), the data communication stops (Step 913) and the user is notified of the data communication stopped status (Step 914).

FIG. 10 shows an example of a cellular phone 1000 compliant with terrestrial digital broadcasting for mobile terminals (1 segment broadcasting service) to which the terminal 100 according to the embodiment is applied. The cellular phone 1000 includes a reception reproduction function of the 1 segment broadcasting service 1002 and a bi-directional digital data communication function using a public wireless network 1005, and can perform the network-linked digital terrestrial television broadcasting operation in which both the functions operate in association with each other. The 1 segment broadcasting service 1002 directly receives a broadcast wave transmitted from a broadcasting station 1001. A bi-directional digital data communication 1007 includes connecting to a content server installed in a cellular phone carrier 1003 via the public wireless network 1005 that is composed of a plurality of wireless base stations 1006. The content server stores information related to television programs of the 1 segment broadcasting service. Address information indicating a location of the information is previously added to the broadcast data. Thus, the information is automatically accessed and acquired to be displayed while a user watches the television program. Also, it is possible for the user to arbitrarily perform a predetermined information acquisition operation for acquiring information to be displayed.

In such a system configuration, a frequency band used by the 1 segment broadcasting service 1002 and a frequency band used by bi directional digital data communication 1007 are adjacent to each other. Depending on certain conditions, the 1 segment broadcasting service reception may have a negative effect from the transmission electric wave of the data communication transmitted from the terminal and a reception error may occur. However, by applying the ON-OFF control for the data communication according to the present invention to the cellular phone, the negative effect on the 1 segment broadcasting service reception can be avoided. In this way, when an error occurs in the broadcast data reception during the network-linked digital terrestrial television broadcasting operation to place priority on the normal reception of the 1 segment broadcasting service 1002, the terminal of the present invention conducts such a control that the transmission operation for the data communication is temporarily stopped to prevent the reception error occurrence in the broadcast data.

Figure 11:
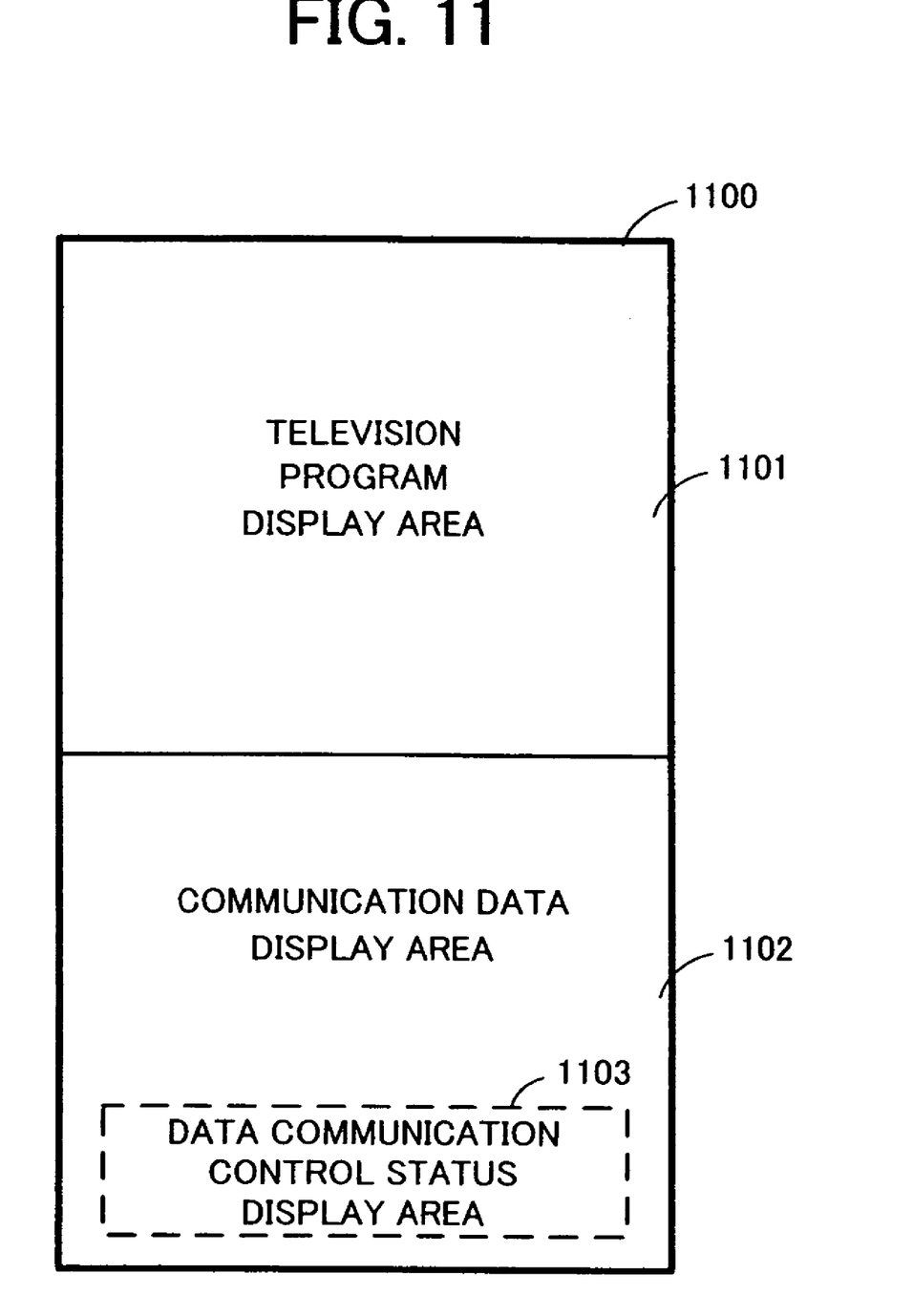
FIG. 11 shows an example of a display mode for notifying a user of an operational status of the ON-OFF control for the data communication.

FIG. 11 shows an example of a display mode for notifying a user of an operational status of the ON-OFF control for the data communication. More specifically, FIG. 11 shows an example of a display content of a monitor 1100 (112) provided to the cellular phone 1000 compliant with the terrestrial digital broadcasting for mobile terminals. An upper area of the monitor is a television program display area 1101 where video received by the 1 segment broadcasting service is displayed. A lower area of the monitor is a communication data display area 1102 where information or the like related to a television program acquired through the data communication is displayed.

A part of the lower area of the monitor display is allocated for a data communication control status display area 1103 with which the user is notified of an operational status of the ON-OFF control for the data communication by displaying texts or the like. Examples of the display text message include "the data communication is being executed" and "the data communication is stopped". The case where the data communication is being executed is a normal condition and therefore the message "the data communication is being executed" may be omitted. The data communication control status display area 1103 may be arranged at any position of the monitor with any size. Also, the notification of the operational status may be performed using a sign, a symbol mark, audio, music, or the like indicating the operational status in addition to the text display on the monitor.

It is needless to mention that the system of network-linked digital terrestrial television broadcasting according to the present invention is applicable not only to the above-mentioned cellular phone compliant with the terrestrial digital broadcasting, but also to various devices in general provided with the television broadcast reception function and the bi-directional digital data communication function where both the functions can simultaneously operate.

While the present invention has been described with reference to the preferred embodiments, it is intended that the invention be not limited by any of the details of the description therein but includes all the embodiments which fall within the scope of the appended claims.

What is claimed is:

1. A communication terminal for receiving digital terrestrial television broadcasts, the terminal comprising:
 a broadcast reception means for receiving a digital broadcast to output broadcast data;
 a communication means for performing wireless communication with a communication network;
 an error detection means for detecting a bit error rate of the broadcast data received by the broadcast reception means; and
 an instruction means for instructing a transmission operation of the communication means to stop when the bit error rate of the broadcast data detected by the error detection means is equal to or higher than a predetermined threshold while the communication means performs the transmission operation.

2. The communication terminal for receiving digital terrestrial television broadcasts according to claim 1, wherein the error detection means starts detecting the bit error rate of the broadcast data when the broadcast reception means and the communication means simultaneously operate.

3. The communication terminal for receiving digital terrestrial television broadcasts according to claim 1, wherein the instruction means comprises:
 a resumption instruction means for instructing the transmission operation of the communication means to resume when the bit error rate detected by the error detection means returns to be lower than the predetermined threshold after a predetermined time elapses from a time when the communication means is set in a stopped status;
 a continuance instruction means for instructing the transmission operation of the communication means to continue when the bit error rate detected by the error detection means is lower than the predetermined threshold while the transmission operation of the communication means is resumed according to the instruction of the resumption instruction means; and
 a stop instruction means for instructing the transmission operation of the communication means to stop when the bit error rate detected by the error detection means is equal to or higher than the predetermined threshold while the transmission operation of the communication means is resumed according to the instruction of the resumption instruction means.

4. The communication terminal for receiving digital terrestrial television broadcasts according to claim 1, wherein the instruction means instructs the transmission operation of the communication means to stop at one of a time when the bit error rate of the broadcast data detected by the error detection means is equal to or higher than the predetermined threshold and a time when a reception error occurs, while the broadcast reception means performs a broadcast reception operation and also the communication means performs the transmission operation.

5. The communication terminal for receiving digital terrestrial television broadcasts according to claim 1, further comprising a notification means for notifying a user of an operational status according to the instruction of the instruction means by way of monitor display and audio.

6. A method of receiving digital terrestrial television broadcasts at a communication terminal, comprising the steps of:
 receiving, at the communication terminal, a digital broadcast to output broadcast data;
 communicating wirelessly from the communication terminal with a broadcasting communication network;
 detecting, within the communication terminal, a bit error rate of the broadcast data received in the receiving step; and
 instructing a transmission operation of the communicating step to stop when the bit error rate of the broadcast data detected in the detecting step is equal to or higher than a predetermined threshold while the transmission operation of the communicating step is performed.

7. The method of receiving digital terrestrial television broadcasts at a communication terminal according to claim 6, wherein the detecting step includes a step of starting to detect the bit error rate of the broadcast data when the receiving and the communicating simultaneously operate.

8. The method of receiving digital terrestrial television broadcasts at a communication terminal according to claim 6, wherein the instructing step includes the steps of:
 instructing the transmission operation of the communicating step to resume when the bit error rate detected in the detecting step returns to be lower than the predetermined threshold after a predetermined time elapses from a time when a stopped status is set in the communicating step;

instructing the transmission operation of the communicating step to continue when the bit error rate detected in the detecting step is lower than the predetermined threshold while the transmission operation of the communicating step is resumed according to the resumption instruction; and instructing the transmission operation of the communicating step to stop again when the bit error rate detected in the detecting step is equal to or higher than the predetermined threshold while the transmission operation of the communicating step is resumed according to the resumption instruction.

9. The method of receiving digital terrestrial television broadcasts at a communication terminal according to claim 6, wherein the instructing step includes the step of instructing the transmission operation of the communicating step to stop at one of a time when the bit error rate of the broadcast data detected in the detecting step is equal to or higher than the predetermined threshold and a time when a reception error occurs, while a broadcast reception operation of the receiving step is performed and also the transmission operation of the communicating step is performed.

10. The method of receiving digital terrestrial television broadcasts at a communication terminal according to claim 6, further comprising a step of notifying a user of an operational status according to the instruction of the instructing by way of monitor display and audio.

* * * * *